United States Patent
Xiao et al.

(10) Patent No.: US 12,446,030 B2
(45) Date of Patent: Oct. 14, 2025

(54) METHOD AND SYSTEM FOR DOWNLINK CONTROL INFORMATION TRANSMISSION

(71) Applicant: ZTE CORPORATION, Guangdong (CN)

(72) Inventors: Kai Xiao, Shenzhen (CN); Xing Liu, Shenzhen (CN); Junfeng Zhang, Shenzhen (CN); Peng Hao, Shenzhen (CN); Xianghui Han, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 421 days.

(21) Appl. No.: 18/159,215

(22) Filed: Jan. 25, 2023

(65) Prior Publication Data

US 2023/0164778 A1    May 25, 2023

Related U.S. Application Data

(63) Continuation of application No. PCT/CN2020/107636, filed on Aug. 7, 2020.

(51) Int. Cl.
*H04W 72/1268* (2023.01)

(52) U.S. Cl.
CPC .................. *H04W 72/1268* (2013.01)

(58) Field of Classification Search
CPC . H04W 72/56; H04W 72/1268; H04W 72/23; H04W 72/21; H04W 72/20; H04W 72/02; H04W 72/12; H04W 72/044
See application file for complete search history.

(56) References Cited

U.S. PATENT DOCUMENTS

| | | | |
|---|---|---|---|
| 2016/0113008 A1 | 4/2016 | Damnjanovic et al. | |
| 2016/0135170 A1 | 5/2016 | Chen et al. | |
| 2020/0229202 A1 | 7/2020 | Bagheri et al. | |
| 2020/0322971 A1* | 10/2020 | Jung | H04W 72/1268 |
| 2020/0359447 A1* | 11/2020 | Yang | H04W 74/0833 |

FOREIGN PATENT DOCUMENTS

| | | |
|---|---|---|
| CN | 110366245 A | 10/2019 |
| CN | 110972303 A | 4/2020 |
| CN | 111357371 A | 6/2020 |

OTHER PUBLICATIONS

First Office Action on CN 202080104685.8 dated Jan. 25, 2025 (with English translation, 10 pages).
China Telecom: "UL inter-UE multiplexing between eMBB and URLLC" 3GPP TSG RAN WG1 #97; R1-1906884; Reno, USA; May 17, 2019 (3 pages).

(Continued)

*Primary Examiner* — Dinh Nguyen
(74) *Attorney, Agent, or Firm* — Foley & Lardner LLP

(57) ABSTRACT

Systems and methods for wireless communications are disclosed herein. In one implementation, a wireless communication device determines that at least a portion of a first uplink (UL) resource is canceled due to overlapping with an indicated resource indicated by an UL Cancelation Indication (UL CI) received from a base station. In one implementation, in response to determining that the at least the portion of the first UL resource is canceled due to overlapping with the indicated resource, a wireless communication device determines whether a second UL resource is used to transmit UL data.

19 Claims, 8 Drawing Sheets

(56) References Cited

OTHER PUBLICATIONS

International Search Report and Written Opinion for PCT Appl. No. PCT/CN2020/107636, mailed May 7, 2021 (9 pages).
Second Office Action for CN Appl. No. 202080104685.8, dated May 22, 2025 (with English translation, 11 pages).
Vivo, "Discussion on handling UL multiplexing of transmissions with different reliability requirements", 3GPP TSG RAN WG1 Meeting #92bis, R1-1803848, Apr. 20, 2018, Sanya, China (10 pages).

* cited by examiner

METHOD AND SYSTEM FOR DOWNLINK CONTROL INFORMATION TRANSMISSION

CROSS-REFERENCE TO RELATED APPLICATION

This application claims the benefit of priority under 35 U.S.C. § 120 as a continuation of PCT Patent Application No. PCT/CN2020/107636, filed on Aug. 7, 2020, the disclosure of which is incorporated herein by reference in its entirety.

TECHNICAL FIELD

The present disclosure relates to the field of telecommunications, and in particular, to downlink control information transmission.

BACKGROUND

Wireless communication service covers more and more application scenarios, with the increasing degree of social digitization. Among them, enhanced mobile broadband, ultra-reliable and low latency communication and massive machine type of communication have become three major scenarios supported by fifth generation (5G) systems.

SUMMARY

The example implementations disclosed herein are directed to solving the issues relating to one or more of the problems presented in the prior art, as well as providing additional features that will become readily apparent by reference to the following detailed description when taken in conjunction with the accompany drawings. In accordance with various implementations, example systems, methods, devices and computer program products are disclosed herein. It is understood, however, that these implementations are presented by way of example and are not limiting, and it will be apparent to those of ordinary skill in the art who read the present disclosure that various modifications to the disclosed implementations can be made while remaining within the scope of this disclosure.

In some implementations, a wireless communication device determines that at least a portion of a first uplink (UL) resource is canceled due to overlapping with an indicated resource indicated by an UL Cancelation Indication (UL CI) received from a base station. In some implementations, in response to determining that the at least the portion of the first UL resource is canceled due to overlapping with the indicated resource, a wireless communication device determines whether a second UL resource is used to transmit UL data.

In some implementations, a wireless communication apparatus includes at least one processor and a memory. In some implementations, the at least one processor is configured to read code from the memory and configured to determine that at least a portion of a first uplink (UL) resource is canceled due to overlapping with an indicated resource indicated by an UL Cancelation Indication (UL CI) received from a base station, and in response to determining that the at least the portion of the first UL resource is canceled due to overlapping with the indicated resource, determine whether a second UL resource is used to transmit UL data.

In some implementations, a computer program product includes a computer-readable program medium with code stored thereupon. In some implementations, the code, when executed by at least one processor, causes the at least one processor to determine that at least a portion of a first uplink (UL) resource is canceled due to overlapping with an indicated resource indicated by an UL Cancelation Indication (UL CI) received from a base station, and in response to determining that the at least the portion of the first UL resource is canceled due to overlapping with the indicated resource, determine whether a second UL resource is used to transmit UL data.

The above and other aspects and their implementations are described in greater detail in the drawings, the descriptions, and the claims.

BRIEF DESCRIPTION OF THE DRAWINGS

Various example implementations of the present solution are described in detail below with reference to the following figures or drawings. The drawings are provided for purposes of illustration only and merely depict example implementations of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE IMPLEMENTATIONS

Figure 1:
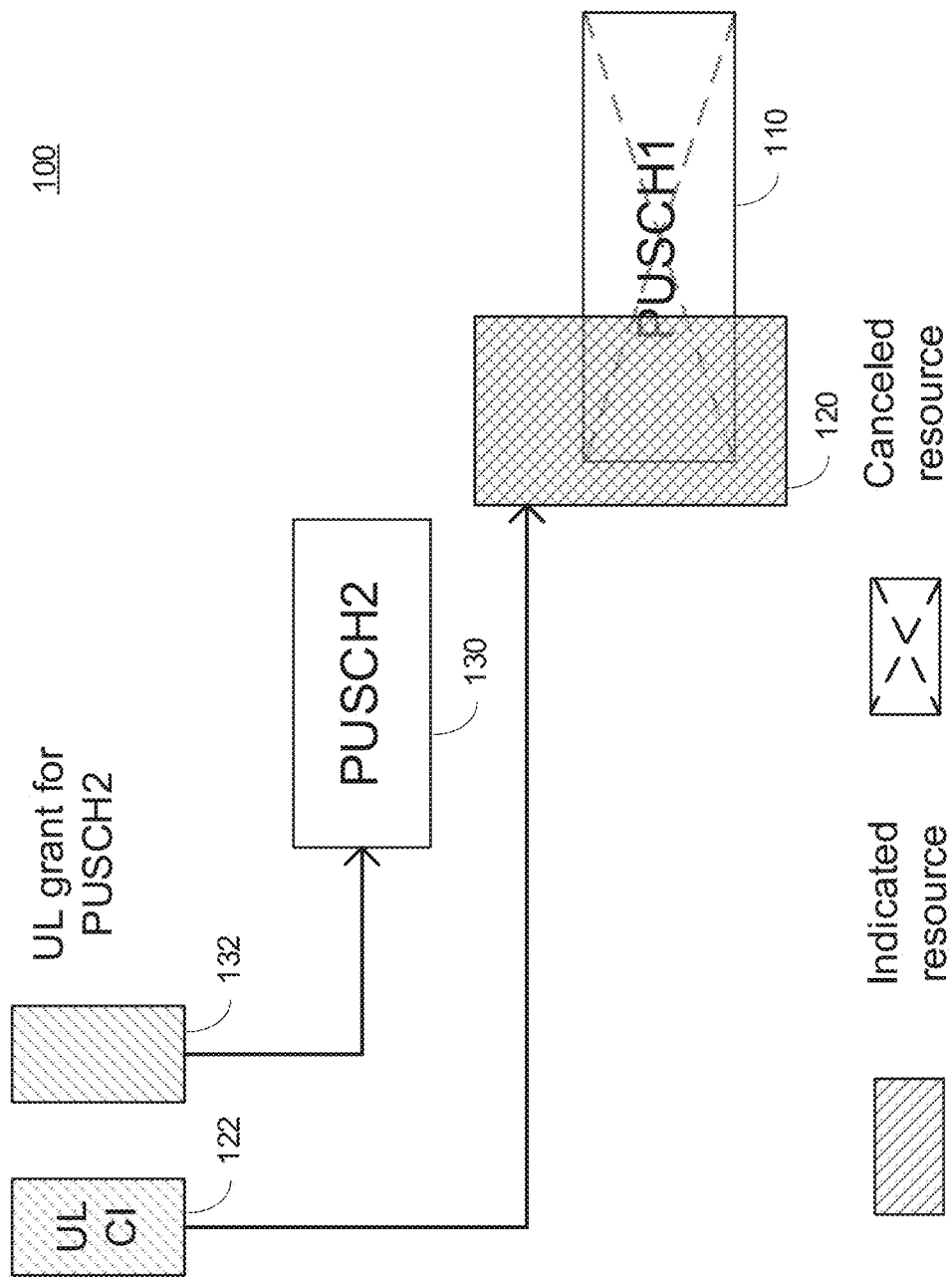
FIG. 1 is a schematic diagram illustrating an exemplary complete cancelation of a first physical uplink shared channel resource (PUSCH1), in accordance with some implementations of the present disclosure.

Various example implementations of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example implementations and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

In some implementations, different services having different priority levels appear in the same network, and the scheduling of high-priority service by a gNodeB base station (gNB) can conflict with the low-priority service. In some implementations, in response to receiving the high-priority service, the gNB side allocates appropriate uplink (UL) resources for it as soon as possible to meet the stringent latency requirements. In some implementations, where resources have been allocated to uplink data transmission for low-priority service in advance, transmission of the low-priority services can be canceled by user equipment (UE) to guarantee the latency and reliability requirement of high-priority transmission. Such an exemplary implementation in accordance with present implementations can avoid collisions between the low-priority services and the high-priority services in transmitting using the same transmission resources.

To minimize performance impact, preemption indication information can, in some implementations, be conveyed to the UE to indicate that its transmission resources have been preempted. The preemption indication information can be referred to as 'cancelation indication information,' including but not limited to downlink control information (DCI). Resource indicated by the cancelation indication information can be referred to as 'indicated resources.' Resource canceled by the UE according to cancelation indication information can be referred to as 'canceled resources.' For uplink transmission, the 'cancelation indication information' can be referred to as an 'Uplink cancelation indication (UL CI).' The network side node, including but not limited to a base station, can transmit the UL CI to a UE for canceling a transmission when the resource occupied by the transmission overlap with other higher transmissions. In some implementations, different UEs have different capabilities, and some UEs cannot perform cancellation accurately at the position of the first symbol of the overlapped symbol. Accordingly, some conditions can be defined to ensure that UE can cancel the overlapping transmission. Conventionally, such conditions have not been defined. In addition, in some implementations, a second transmission cannot be scheduled before the first transmission if the DCI corresponding the first transmission arrives earlier than the DCI corresponding to the second transmission. Further, in some implementations, the first transmission can be cancelled by UE before scheduling the second transmission. Accordingly, some conditions can be defined for avoiding such unreasonable restrictions. Conventionally, such conditions have not been defined.

FIG. 1 is a schematic diagram illustrating an exemplary complete cancelation of a first physical uplink shared channel resource (PUSCH1), in accordance with some implementations of the present disclosure. Exemplary implementation 100 describes one exemplary condition definition of UL grant transmission. As shown by way of example in FIG. 1, the indicated resource 120 indicated by UL CI 122 can overlap with a first physical uplink shared channel (PUSCH1) 110. In some implementations, the PUSCH1 resource 110 overlaps with the indicated resource 120, and the UE cancels the whole PUSCH1 resource 110. In some implementations, determining whether another transmission can be transmitted can include at least one of the following. In some implementations, another transmission includes, but is not limited to, a second physical uplink shared channel (PUSCH2) 130 scheduled by a corresponding UL grant 132. In some implementations, where PUSCH1 110 is completely canceled, PUSCH2 130 can be scheduled either before or after PUSCH1 110.

In some implementations, the PUSCH2 resource 130 can be scheduled at least one of before the indicated resource 120 and before the completely canceled PUSCH1 resource 110. In some implementations, PUSCH2 130 can be scheduled by the UL grant 132 before the indicated resource 120, in response to complete cancelation of the whole PUSCH1 resource 110 by a UE. In some implementations, the PUSCH2 130 is scheduled by a predefined protocol. As illustrated by way of example in FIG. 1, a time of occurrence of the last symbol of PUSCH2 130 scheduled by the UL grant 132 is before a time of occurrence of the first symbol of the indicated resource. In some implementations, the PUSCH2 resource 130 is scheduled by the UL grant before the PUSCH1 resource 110, in response to complete cancelation of the whole PUSCH1 resource 110 by a UE. In some implementations, the PUSCH2 130 is scheduled by a predefined protocol. In some implementations, a time of occurrence of the last symbol of PUSCH2 130 scheduled by the UL grant 132 is located before an occurrence of the first symbol of the PUSCH1 resource 110.

In some implementations, the PUSCH2 resource 130 can be scheduled at least one of after the indicated resource 120 and after the completely canceled PUSCH1 resource 110. The PUSCH2 130 is scheduled by the UL grant 132 after the indicated resource 120, in response to cancelation of the whole PUSCH1 resource 110 by a UE. In some implementations, the PUSCH2 130 is scheduled by a predefined protocol. In some implementations, a time of occurrence of the first symbol of PUSCH2 130 scheduled by the UL grant 132 is after a time of occurrence of the last symbol of the indicated resource 120. In some implementations, the PUSCH2 130 is scheduled by the UL grant after the PUSCH1 resource 110, in response to cancelation of the whole PUSCH1 resource 110 by a UE. In some implementations, the PUSCH2 130 is scheduled by a predefined protocol. In some implementations, a time of occurrence of the first symbol of PUSCH2 130 scheduled by the UL grant 132 is after a time of occurrence of the last symbol of the PUSCH1 resource 110.

It is to be understood that the PUSCH2 130 can be scheduled by the UL grant 132 in any resource except the indicated resource 120 overlapped with PUSCH1 110 in the time domain, in response to cancelation of the whole PUSCH1 resource 110 by a UE. In some implementations, the PUSCH2 130 is scheduled by a predefined protocol. In some implementations, a time of occurrence of the last symbol of PUSCH2 130 scheduled by the UL grant 132 is before a time of occurrence of the first symbol of the PUSCH1 resource 110, or a time of occurrence the first symbol of PUSCH2 130 scheduled by the UL grant is after a time of occurrence of the last symbol of the PUSCH1 resource 110. Exemplary implementation 100 illustrates a time of the last symbol of the PUSCH2 130 occurring both before a time of occurrence of the PUSCH1 110 and a time of occurrence of the indicated resource 120. It is to be understood, however, that the time of the last symbol of the PUSCH2 130 can alternatively occur either before a time of occurrence of the PUSCH1 110 and a time of occurrence of the indicated resource 120 in accordance with some implementations of the present disclosure.

Figure 2:
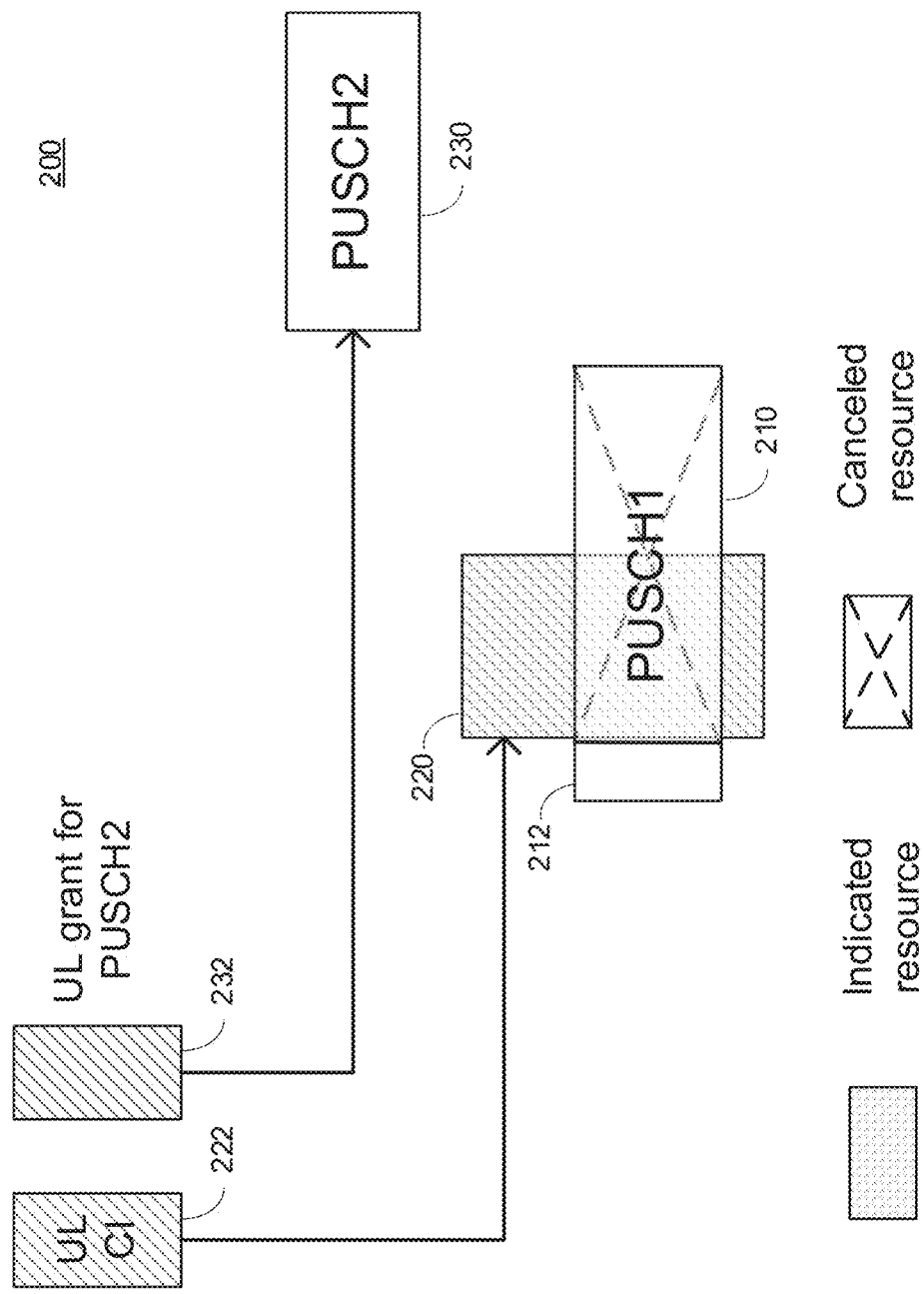
FIG. 2 is a schematic diagram illustrating an exemplary partial cancelation of a first physical uplink shared channel resource (PUSCH1), in accordance with some implementations of the present disclosure.

FIG. 2 is a schematic diagram illustrating an exemplary partial cancelation of a first physical uplink shared channel resource (PUSCH1), in accordance with some implementations of the present disclosure. Exemplary implementation 200 describes one exemplary condition definition of UL grant transmission. As shown by way of example in FIG. 2, an indicated resource 220 indicated by UL CI 222 can overlap with a first physical uplink shared channel (PUSCH1) 210 and 212. In some implementations, the PUSCH1 resource 210 and 212 overlaps with an indicated resource 220 indicated by UL CI 222, and the UE partially cancels only the canceled resource 210 of the PUSCH1 resource 210 and 212. In some implementations, determining whether another transmission can be transmitted can include at least one of the following. In some implementations, another transmission includes, but is not limited to, a second physical uplink shared channel PUSCH2 230 scheduled by a UL grant 232.

In some implementations, the PUSCH2 230 is scheduled by the UL grant 232 after the canceled resource 210. In some implementations, the PUSCH2 230 is scheduled by a predefined protocol. In some implementations, a time of occurrence of a first symbol of PUSCH2 230 scheduled by the UL grant 232 is after a time of occurrence of the last symbol of the canceled resource 210. In some implementations, the canceled resource 210 is the actual resource canceled by the UE according to the UL CI 222. In some implementations, the PUSCH2 230 is scheduled by the UL grant 232 after the PUSCH1 resource 210 and 212. In some implementations, the PUSCH2 230 is scheduled by the UL grant 232 by a predefined protocol. In some implementations, the time of occurrence of the first symbol of PUSCH2 230 scheduled by the UL grant 232 is after the time of occurrence of the last symbol of the PUSCH1 resource 210 and 212.

Figure 3:
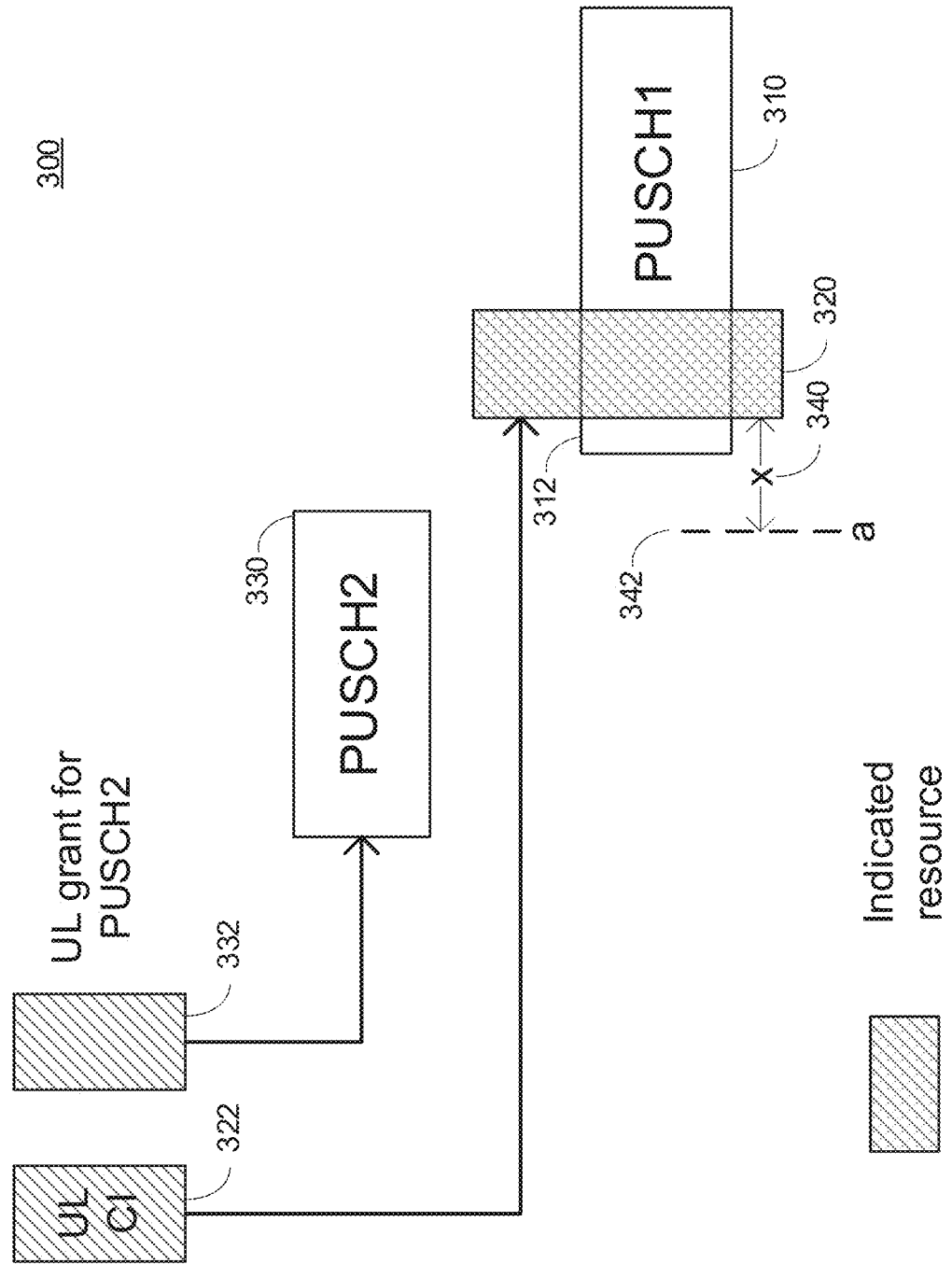
FIG. 3 is a schematic diagram illustrating an exemplary complete cancelation of a first physical uplink shared channel resource (PUSCH1) based on at least one cancelation reference time point, in accordance with some implementations of the present disclosure.

FIG. 3 is a schematic diagram illustrating an exemplary complete cancelation of a first physical uplink shared channel resource (PUSCH1) based on at least one cancelation reference time point, in accordance with some implementations of the present disclosure. Exemplary implementation 300 describes one exemplary condition definition of UL grant transmission. As shown by way of example in FIG. 3, a resource 320 indicated by UL CI 322 can overlap with PUSCH1 310. In some implementations, the PUSCH1 resource 310 overlaps with the resource 320 indicated by UL CI 322, and the UE cancels PUSCH1 at exemplary cancelation time point a 342. In some implementations, a duration time x 340 is between a 342 and a time of occurrence of the first symbol of PUSCH1 310. In some implementations, a time of occurrence of the first symbol of the PUSCH1 resource 310 is no earlier than the cancelation time point a 342, and the UE cancels the whole PUSCH1 resource 310 according to UL CI 322. In some implementations, determining whether another transmission can be transmitted can include at least one of the following. In some implementations, another transmission includes PUSCH2 330 scheduled by a UL grant 332.

In some implementations, the PUSCH2 is scheduled by the UL grant before at least one of the indicated resource 320, the PUSCH1 resource 310, and the cancelation time point a 342. In some implementations, the PUSCH2 330 is scheduled by the UL grant before the indicated resource 320, in response to cancelation of the whole PUSCH1 resource 310 by a UE. In some implementations, the PUSCH2 330 is scheduled by the UL grant by a predefined protocol. In some implementations, a time of occurrence of the last symbol of PUSCH2 330 scheduled by the UL grant 332 is before a time of occurrence of the first symbol of the indicated resource 320. In some implementations, the PUSCH2 330 is scheduled by the UL grant 332 before the PUSCH1 resource 310, in response to cancelation of the whole PUSCH1 resource 310 by a UE. In some implementations, the PUSCH2 330 is scheduled by the UL grant 332 by a predetermined protocol. In some implementations, the time of occurrence of the last symbol of PUSCH2 330 scheduled by the UL grant 332 is located before the time of occurrence of the first symbol of the PUSCH1 resource 310. In some implementations, the PUSCH2 330 is scheduled by the UL grant before the cancelation time point a 342, in response to cancelation of the whole PUSCH1 resource 310 by a UE. In some implementations, the PUSCH2 330 is scheduled by the UL grant by a predetermined protocol. In some implementations, the time of occurrence of the last symbol of PUSCH2 330 scheduled by the UL grant 332 is before cancelation time point a 342.

In some implementations, the PUSCH2 is scheduled by the UL grant after at least one of the indicated resource 320, the PUSCH1 resource 310, and the cancelation time point a 342. In some implementations, the PUSCH2 330 is scheduled by the UL grant after the indicated resource 320, in response to cancelation of the whole PUSCH1 resource 310 by a UE. In some implementations, the PUSCH2 330 is scheduled by the UL grant by a predefined protocol. In some implementations, a time of occurrence of the first symbol of PUSCH2 330 scheduled by the UL grant 332 is after a time of occurrence of the last symbol of the indicated resource 320. In some implementations, the PUSCH2 330 is scheduled by the UL grant 332 after the PUSCH1 resource 310, in response to cancelation of the whole PUSCH1 resource 310 by a UE. In some implementations, the PUSCH2 330 is scheduled by the UL grant 332 by a predetermined protocol. In some implementations, the time of occurrence of the first symbol of PUSCH2 330 scheduled by the UL grant 332 is located after the time of occurrence of the last symbol of the PUSCH1 resource 310. In some implementations, the PUSCH2 330 is scheduled by the UL grant after the cancelation time point a 342, in response to cancelation of the whole PUSCH1 resource 310 by a UE. In some implementations, the PUSCH2 330 is scheduled by the UL grant by a predetermined protocol. In some implementations, the time of occurrence of the first symbol of PUSCH2 330 scheduled by the UL grant 332 is after cancelation time point a 342.

Figure 4:
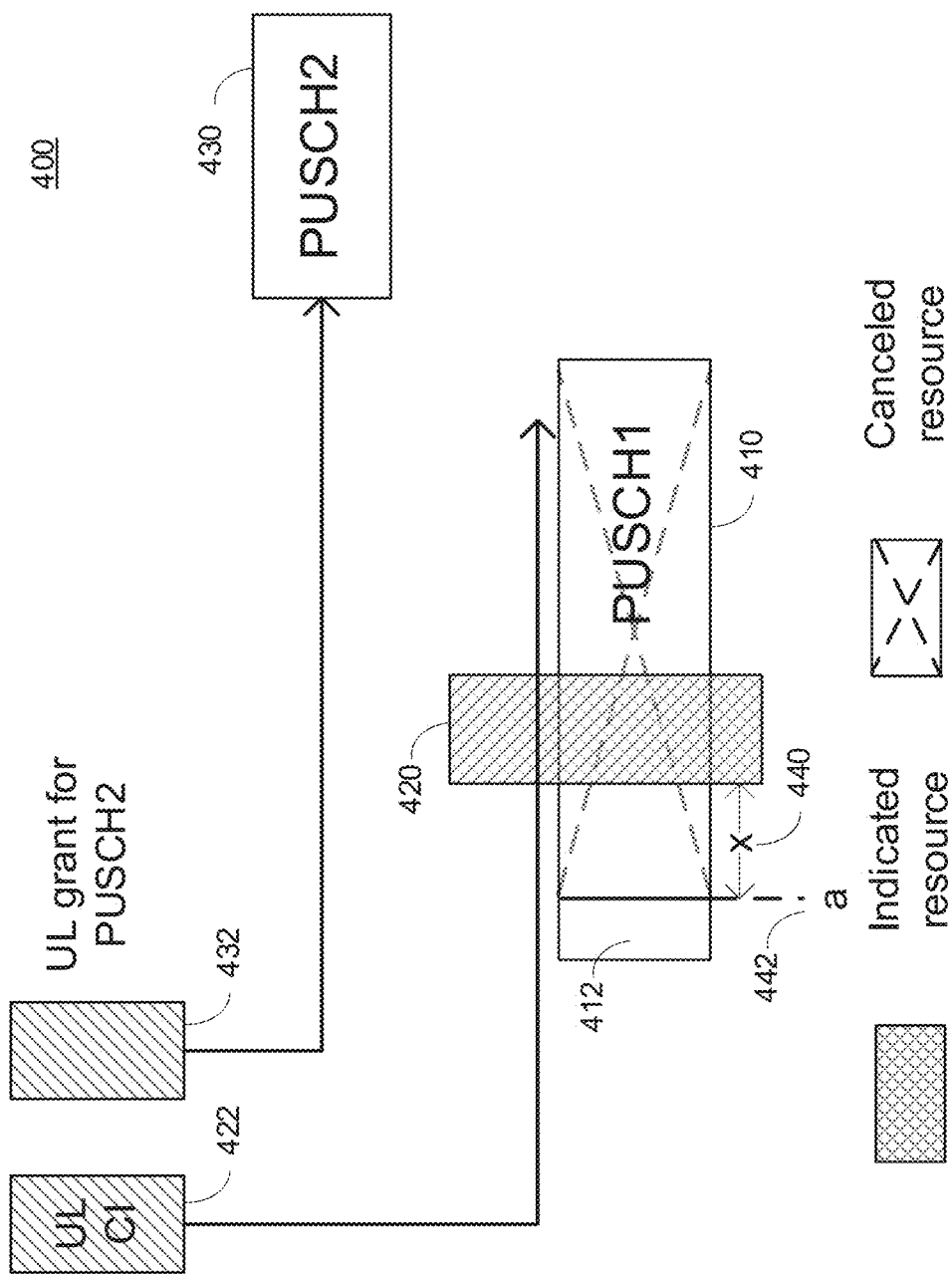
FIG. 4 is a schematic diagram illustrating an exemplary partial cancelation of a first physical uplink shared channel resource (PUSCH1) based on at least one cancelation reference time point, in accordance with some implementations of the present disclosure.

FIG. 4 is a schematic diagram illustrating an exemplary partial cancelation of a first physical uplink shared channel resource (PUSCH1) based on at least one cancelation reference time point, in accordance with some implementations of the present disclosure. Exemplary implementation 400 describes one exemplary condition definition of UL grant transmission. As shown by way of example in FIG. 4, the resource 420 indicated by UL CI 422 can overlap with PUSCH1 410 and 412. In some embodiments, the PUSCH1 resource 410 and 412 overlaps with the resource 420 indicated by UL CI 422, and the UE cancels PUSCH1 410 at cancelation time point a 442. In some implementations, a duration time x 440 is between a 442 and a time of occurrence of the first symbol of PUSCH1. In some implementations, the time of occurrence of the first symbol of the PUSCH1 resource 410 and 412 is earlier than the cancelation time point a 442, and UE cancels a part of PUSCH1 resource 410 subsequent to the time of occurrence of a 442 according to UL CI 422. In some implementations, determining whether another transmission can be transmitted can include at least one of the following. In some implementations, another transmission includes PUSCH2 430 scheduled by a UL grant 432.

In some implementations, the PUSCH2 is scheduled by the UL grant after at least one of the canceled resource 410, the PUSCH1 resource 410 and 412, and the cancelation time point a 442. The PUSCH2 is scheduled by the UL grant after the canceled resource by protocol predefined. The first symbol of PUSCH2 scheduled by the UL grant is after the last symbol of the canceled resource. The canceled resource is the actual resource canceled by the UE according to the UL CI. In some implementations, the PUSCH2 430 is scheduled by the UL grant 432 after the PUSCH1 resource. In some implementations, the PUSCH2 430 is scheduled by the UL grant 432 by a predefined protocol. In some implementations, the time of occurrence of the first symbol of PUSCH2 430 scheduled by the UL grant 432 is after the time of occurrence of the last symbol of the PUSCH1 resource 410 and 412. In some implementations, the PUSCH2 430 is scheduled by the UL grant 432 after the cancelation time point a 442, in response to cancelation of the partial PUSCH1 resource 410 by a UE. In some implementations, the PUSCH2 430 is scheduled by the UL grant 432 by a predetermined protocol. In some implementations, the time of occurrence of the first symbol of PUSCH2 430 scheduled by the UL grant 432 is located after cancelation time point a 442.

Exemplary implementation 400 illustrates a time of the last symbol of the PUSCH2 430 occurring both after a time of occurrence of the PUSCH1 410 and 412 and a time of occurrence of the canceled resource 420. It is to be understood, however, that the time of the last symbol of the PUSCH2 430 can alternatively occur before one or more of a time of occurrence of the PUSCH1 410 and a time of occurrence of the canceled resource 420 in accordance with some implementations of the present disclosure.

Figure 5:
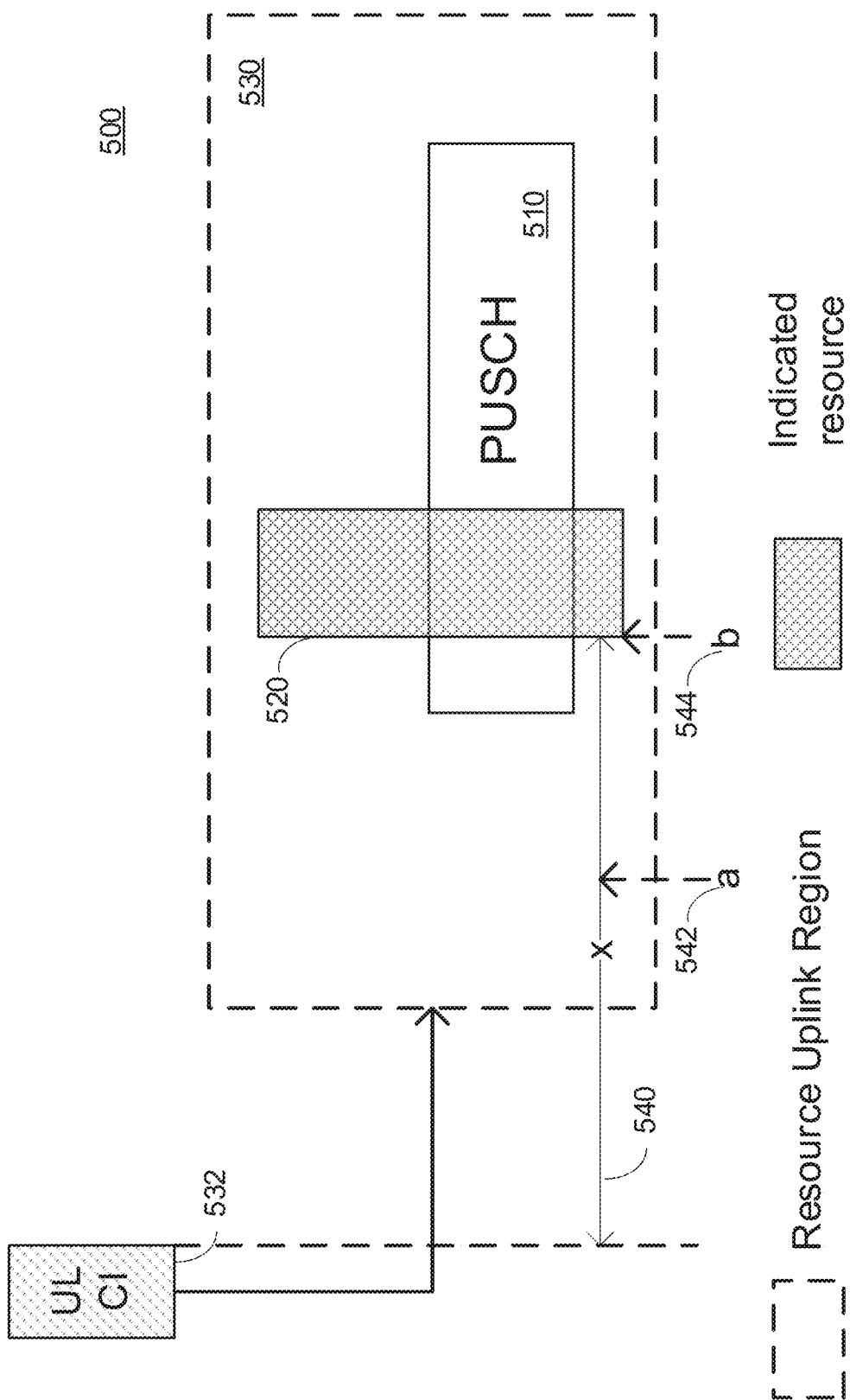
FIG. 5 is a schematic diagram illustrating an exemplary cancelation of a first physical uplink shared channel resource (PUSCH1) based on a plurality of cancelation reference time points and at least one duration threshold, in accordance with some implementations of the present disclosure.

FIG. 5 is a schematic diagram illustrating an exemplary cancelation of a first physical uplink shared channel resource (PUSCH1) based on a plurality of cancelation reference time points and at least one duration threshold, in accordance with some implementations of the present disclosure. Exemplary implementation 500 describes one exemplary condition definition of UL grant transmission. In some implementations, the exemplary implementation 500 includes a resource uplink region (RUR) 530.

In some implementations, a PUSCH 510 is canceled by UE, in response to a state in which the PUSCH 510 overlaps with the resource 520 indicated by UL CI 532. As shown by way of example in FIG. 5, the UE can cancel this PUSCH 510 at one or more of cancelation time points a 542 and b 544. In some implementations, a time of occurrence of point a 542 is between a time of occurrence of the last symbol of UL CI 532 and a time of occurrence of the first symbol of the indicated resource overlapping PUSCH 510. In some implementations, the time of occurrence of point b 544 is at the time of occurrence of the first symbol of the indicated resource 520 overlapping PUSCH 510. In some implementations, the duration x 540 is between the time of occurrence of the last symbol of UL CI 532 and the time of occurrence of the first symbol of the indicated resource 520 overlapping PUSCH 510. In some implementations, determining the cancelation time point includes at least one of the following. In some implementations, determining the cancelation time point includes determining the cancelation time point by the UE.

In some implementations, determining includes UE capability signaling at one or more of high layer signaling and physical layer signaling. In some implementations, UE capability signaling includes high layer signaling. In some implementations, high layer signaling includes, but is not limited to, RRC signaling or a predefined protocol. In some implementations, a logical bit or the like indicates UE capability high layer signaling. As one example, 0 can represent that UE cancels PUSCH 510 at point a 542, and 1 can represent that UE cancels PUSCH 510 at point b 544. As another example, 1 can represent UE canceling PUSCH 510 at point a 542, and 0 can represent UE canceling PUSCH 510 at point b 544. In some implementations, UE capability signaling includes physical layer signaling. In some implementations, physical layer signaling includes, but is not limited to, DCI carrier or device, or a predefined protocol. In some implementations, a logical bit or the like indicates UE capability physical layer signaling. As one example, 0 can represent that UE cancels PUSCH 510 at point a 542, and 1 can represent that UE cancels PUSCH at point b 544. As another example, 1 can represent UE canceling PUSCH 510 at point a 542, and 0 can represent UE canceling PUSCH at point b 544.

In some implementations, determining the cancelation time point from among points a 542 and b 544 is based at least partially on transmission type. In some implementations, PUSCH 510 is canceled by UE, in response to a state in which the PUSCH 510 overlaps with the resource 520 indicated by UL CI 532. As shown by way of example in FIG. 5, the UE can cancel this PUSCH 510 at one or more of cancelation time points a 542 and b 544. In some implementations, a time of occurrence of point a 542 is between the time of occurrence of the last symbol of UL CI 532 and time of occurrence of the first symbol of the indicated resource 520 overlapping PUSCH 510. In some implementations, point b 544 is at time of occurrence of the first symbol of the indicated resource 520 overlapping PUSCH 510. In some implementations, the duration x 540 is between the time of occurrence of the last symbol of UL CI 532 and the time of occurrence of the first symbol of the indicated resource 544 overlapping PUSCH 510. In some implementations, determining the cancellation time point includes at least one of the following. In some implementations, determining the cancelation time point includes determining the cancelation time point by the UE. In some implementations, UE determines the cancelation time point according to the transmission type of PUSCH 510 to be cancelled. In some implementations, UE cancels PUSCH at point b 544 in response to determining that PUSCH 510 is associated with transmission type A, and alternatively cancels PUSCH at point a 542. In some implementations, the transmission type A is defined by a predefined protocol. In some implementations, the transmission type A includes at least one transmission type (e.g. code block group transmission).

Figure 6:
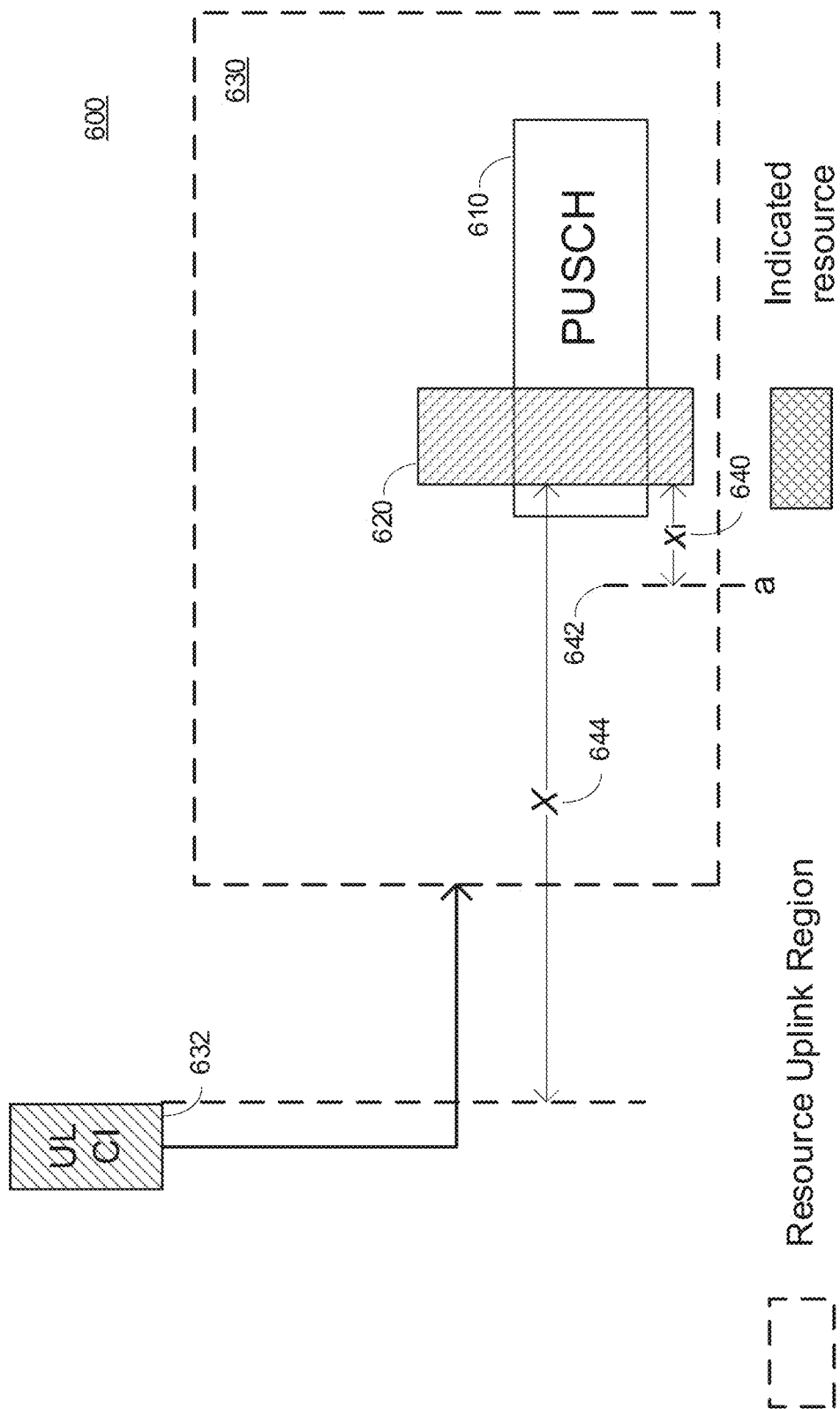
FIG. 6 is a schematic diagram illustrating an exemplary cancelation of a first physical uplink shared channel resource (PUSCH1) based on at least one cancelation reference time point corresponding to at least duration threshold, in accordance with some implementations of the present disclosure.

FIG. 6 is a schematic diagram illustrating an exemplary cancelation of a first physical uplink shared channel resource (PUSCH1) based on at least one cancelation reference time point corresponding to at least one duration threshold, in accordance with some implementations of the present disclosure. Exemplary implementation 600 describes one exemplary condition definition of UL grant transmission. In some implementations, PUSCH 610 is canceled by UE, in response to a determination that the PUSCH 610 overlaps with the resource indicated by UL CI. As shown by way of example in FIG. 6, the UE can cancel this PUSCH 610 at cancelation time point a 642. In some implementation, the duration X 644 is between a time of occurrence of the last symbol of UL CI 632 and a time of occurrence of the first symbol of the indicated resource 620 overlapping PUSCH 610. In some implementations, the duration $x_i$ (i=0,1, . . . , n−1) 640 is between the time of occurrence of point a 642 and the time of occurrence of the first symbol of the indicated resource 620 overlapping PUSCH 610. In some implementations, n is the number of $x_i$ 640, which can be configured by the high layer signaling, determined by a pre-defined protocol, or the like. In some implementations, determining the cancelation time point a 642 includes at least one of the following. In some implementations, determining the cancelation time point includes determining the cancelation time point by the UE.

In some implementations, UE capability signaling includes high layer signaling. In some implementations, high layer signaling includes, but is not limited to, RRC signaling. In some implementations, UE capability signaling is m bits and m=$\lceil \log_2 n \rceil$. In some implementations, the decimal index represented by m bits corresponds to $x_i$ value one by one. In some implementations, $x_i$ is at least one of configured by high layer signaling, determined by a pre-defined protocol, and the like. In some implementations, UE determines the value of $x_i$ according to the decimal index value, and further determines the cancelation time point a 642. For example, $x_i$ is pre-defined by protocol as [0 2 4 6], and m=2, thus 00 for 0, 01 for 2, 10 for 4, 11 for 6. In this example, UE capability signaling indication is 10, and in response the UE cancels PUSCH 610 at 4 symbols before the first symbol of the indicated resource overlapping PUSCH 610.

In some implementations, a further UE capability signaling includes high layer signaling. In some implementations, high layer signaling includes, but is not limited to, RRC signaling or is predefined by protocol. In some implementations, UE capability signaling is m bits and m=$\lceil \log_2 n \rceil$. In some implementations, the decimal index represented by m bits corresponds to $y_i$(i=0,1, . . . , n−1) value one by one. In some implementations, $y_i$ is configured by the high layer signaling or determined by pre-defined protocol. In some implementations, $y_i$ is $0 \leq y_i \leq 1$. In some implementations, UE determines the cancelation time point a 642 according to the value of $x_i$, and $x_i=\lceil X \times y_i \rceil$ or $x_i=\lfloor X \times y_i \rfloor$. For example, $y_i$ is pre-defined by protocol as [0 0.25 0.5 1], m=2, and X=14, thus 00 for 0, 01 for 0.25, 10 for 0.5, 11 for 1. In this example, UE capability signaling indication is 10, and in response the UE cancels PUSCH 610 at $\lceil 14*0.5 \rceil$=7 symbols before the first symbol of the indicated resource 620 overlapping PUSCH 610.

Figure 7:
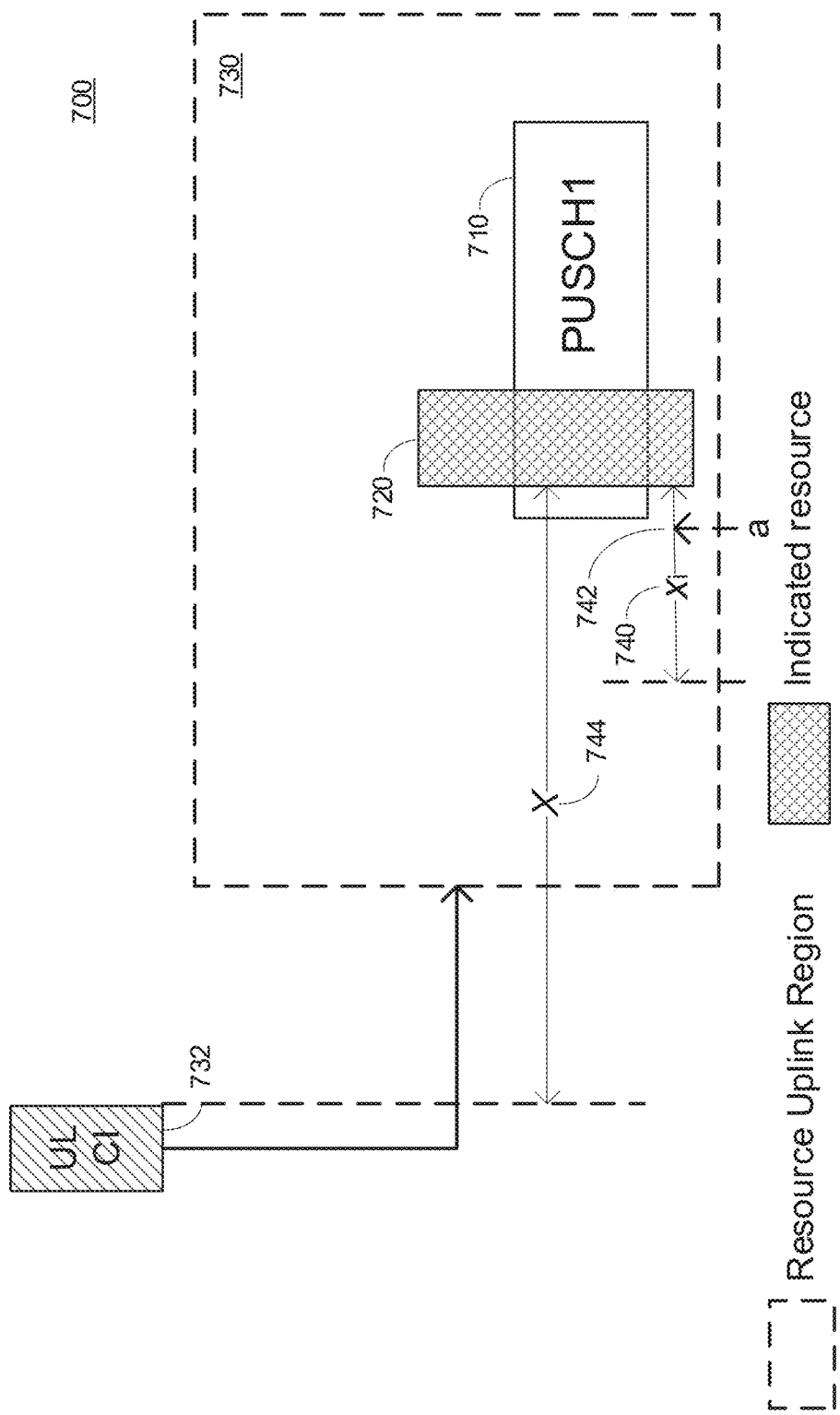
FIG. 7 is a schematic diagram illustrating an exemplary cancelation of a first physical uplink shared channel resource (PUSCH1) based on at least one cancelation reference time point adjustably within at least one duration threshold period, in accordance with some implementations of the present disclosure.

FIG. 7 is a schematic diagram illustrating an exemplary cancelation of a first physical uplink shared channel resource (PUSCH1) based on at least one cancelation reference time point adjustably within at least one duration threshold period, in accordance with some implementations of the present disclosure. Exemplary implementation 700 describes one exemplary condition definition of UL grant transmission. In some implementations, PUSCH 710 is canceled by UE, in response to a determination that the PUSCH 710 overlaps with the resource 720 indicated by UL CI 732. As shown by way of example in FIG. 7, the UE can cancel this PUSCH 710 at cancelation time point a 742. In some implementations, the duration X 744 is between the time of occurrence of the last symbol of UL CI 732 and the time of occurrence of the first symbol of the indicated resource 720 overlapping PUSCH 710. In some implementations, the duration between the time of occurrence of point a 742 and the time of occurrence of the first symbol of the indicated resource 720 overlapping PUSCH 710 is no longer than $x_i$(i=0,1, . . . , n−1). In some implementations, n is the number of $x_i$, which can be configured by the high layer signaling, determined by a pre-defined protocol, or the like. In some implementations, determining the cancelation time point a 742 includes at least one of the following. In some implementations, determining the cancelation time point includes determining the cancelation time point by the UE.

In some implementations, UE capability signaling includes high layer signaling. In some implementations, high layer signaling includes, but is not limited to, RRC signaling. In some implementations, UE capability signaling is m bits and m=$\lceil \log_2 n \rceil$. In some implementations, the decimal index represented by m bits corresponds to $x_i$ 740 value one by one. In some implementations, $x_i$ 740 is at least one of configured by high layer signaling, determined by a pre-defined protocol, and the like. In some implementations, UE determines the value of $x_i$ 740 according to the decimal index value, and further determines the cancelation time point a 742. For example, $x_i$ 740 is pre-defined by protocol as [0 2 4 6], and m=2, thus 00 for 0, 01 for 2, 10 for 4, 11 for 6. In this example, the UE capability signaling indication is 10, and in response the UE cancels PUSCH 710 between the first symbol of the indicated resource overlapping PUSCH 710 and the symbol that is 4 symbols before the first symbol of the indicated resource 720 overlapping PUSCH 710.

In some implementations, a further UE capability signaling includes high layer signaling. In some implementations, high layer signaling includes, but is not limited to, RRC signaling or is predefined by protocol. In some implementations, the UE capability signaling is m bits and m=$\lceil \log_2 n \rceil$. In some implementations, the decimal index represented by m bits corresponds to $y_i$(i=0,1, . . . , n−1) value one by one. In some implementations, the $y_i$ is configured by the high layer signaling or determined by pre-defined protocol. In some implementations, $y_i$ is $0 \leq y_i \leq 1$. In some implementations, UE determines the cancelation time point a 742 according to the value of $x_i$ 740, and $x_i=\lceil X \times y_i \rceil$ or $x_i=\lfloor X \times y_i \rfloor$. For example, $y_i$ is pre-defined by protocol as [0 0.25 0.5 1], m=2, and X=14, thus 00 for 0, 01 for 0.25, 10 for 0.5, 11 for 1. In this example, the UE capability signaling indication is 10, an in response the UE cancels PUSCH 710 between the first symbol of the indicated resource 720 overlapping PUSCH 710 and the symbol that is $\lceil 14*0.51 \rceil$=7 symbols before the first symbol of the indicated resource 720 overlapping PUSCH 710.

Figure 8B:
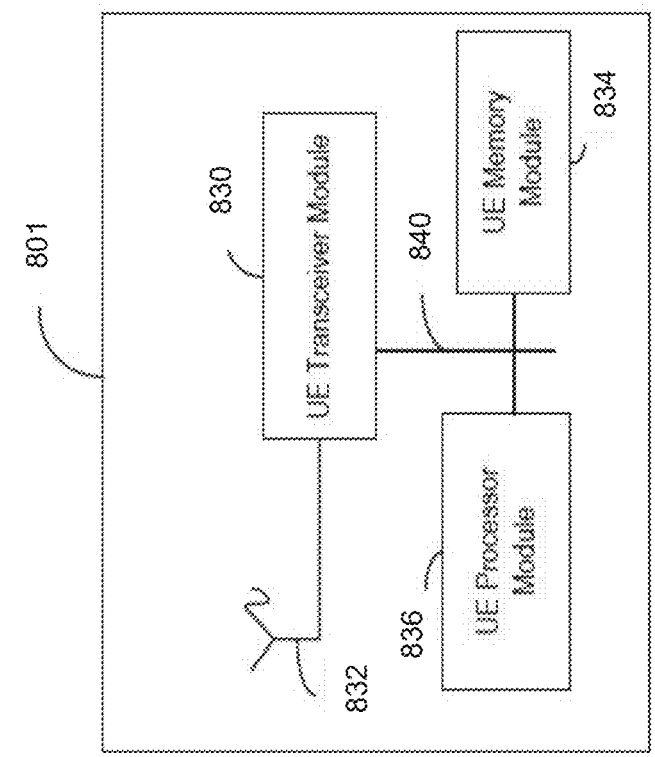
FIG. 8B illustrates a block diagram of an example UE, in accordance with some implementations of the present disclosure.
Figure 8A:
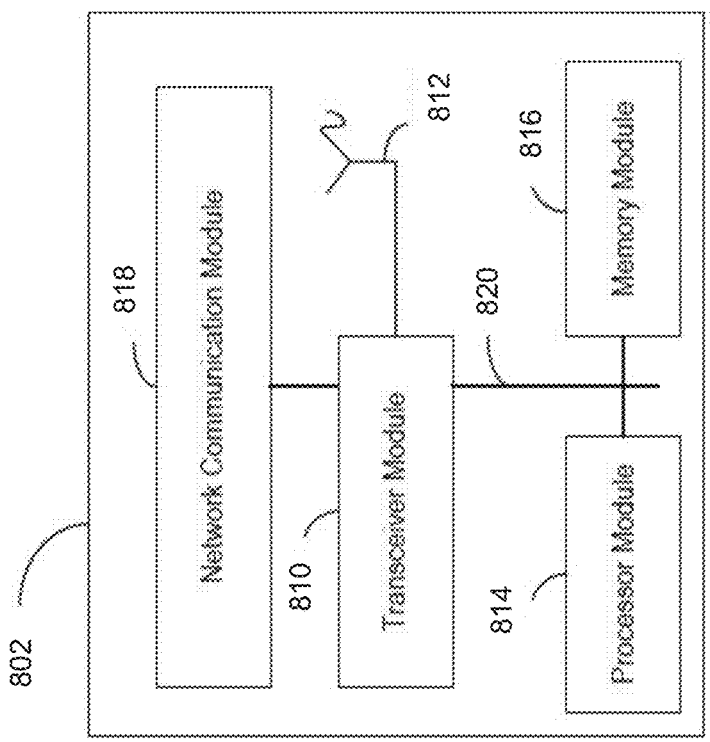
FIG. 8A illustrates a block diagram of an example base station, in accordance with some implementations of the present disclosure.

FIG. 8A illustrates a block diagram of an example base station 802, in accordance with some implementations of the present disclosure. FIG. 8B illustrates a block diagram of an example UE 801, in accordance with some implementations of the present disclosure. Referring to FIGS. 1-8B, the UE 801 (e.g., a wireless communication device, a terminal, a mobile device, a mobile user, and so on) is an example implementation of the UEs described herein, and the base station 802 is an example implementation of the base station described herein.

The base station 802 and the UE 801 can include components and elements configured to support known or conventional operating features that need not be described in detail herein. In one illustrative implementation, the base station 802 and the UE 801 can be used to communicate (e.g., transmit and receive) data symbols in a wireless communication environment, as described above. For instance, the base station 802 can be a base station (e.g., gNB, eNB, and so on), a server, a node, or any suitable computing device used to implement various network functions.

The base station 802 includes a transceiver module 810, an antenna 812, a processor module 814, a memory module 816, and a network communication module 818. The modules 810, 812, 814, 816, and 818 are operatively coupled to and interconnected with one another via a data communication bus 820. The UE 801 includes a UE transceiver module 830, a UE antenna 832, a UE memory module 834, and a UE processor module 836. The modules 830, 832, 834, and 836 are operatively coupled to and interconnected with one another via a data communication bus 840. The base station 802 communicates with the UE 801 or another base station via a communication channel, which can be any wireless channel or other medium suitable for transmission of data as described herein.

As would be understood by persons of ordinary skill in the art, the base station 802 and the UE 801 can further include any number of modules other than the modules shown in FIGS. 8A and 8B. The various illustrative blocks, modules, circuits, and processing logic described in connection with the implementations disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The implementations described herein can be implemented in a suitable manner for each particular application, but any implementation decisions should not be interpreted as limiting the scope of the present disclosure.

In accordance with some implementations, the UE transceiver 830 includes a radio frequency (RF) transmitter and a RF receiver each including circuitry that is coupled to the antenna 832. A duplex switch (not shown) may alternatively couple the RF transmitter or receiver to the antenna in time duplex fashion. Similarly, in accordance with some implementations, the transceiver 810 includes an RF transmitter and a RF receiver each having circuitry that is coupled to the antenna 812 or the antenna of another base station. A duplex switch may alternatively couple the RF transmitter or receiver to the antenna 812 in time duplex fashion. The operations of the two transceiver modules 810 and 830 can be coordinated in time such that the receiver circuitry is coupled to the antenna 832 for reception of transmissions over a wireless transmission link at the same time that the transmitter is coupled to the antenna 812. In some implementations, there is close time synchronization with a minimal guard time between changes in duplex direction.

The UE transceiver 830 and the transceiver 810 are configured to communicate via the wireless data communication link, and cooperate with a suitably configured RF antenna arrangement 812/832 that can support a particular wireless communication protocol and modulation scheme. In some illustrative implementations, the UE transceiver 830 and the transceiver 810 are configured to support industry standards such as the Long Term Evolution (LTE) and emerging 5G standards, and the like. It is understood, however, that the present disclosure is not necessarily limited in application to a particular standard and associated protocols. Rather, the UE transceiver 830 and the base station transceiver 810 may be configured to support alternate, or additional, wireless data communication protocols, including future standards or variations thereof.

The transceiver 810 and the transceiver of another base station (such as but not limited to, the transceiver 810) are configured to communicate via a wireless data communication link, and cooperate with a suitably configured RF antenna arrangement that can support a particular wireless communication protocol and modulation scheme. In some illustrative implementations, the transceiver 810 and the transceiver of another base station are configured to support industry standards such as the LTE and emerging 5G standards, and the like. It is understood, however, that the present disclosure is not necessarily limited in application to a particular standard and associated protocols. Rather, the transceiver 810 and the transceiver of another base station may be configured to support alternate, or additional, wireless data communication protocols, including future standards or variations thereof.

In accordance with various implementations, the base station 802 may be a base station such as but not limited to, an eNB, a serving eNB, a target eNB, a femto station, or a pico station, for example. The base station 802 can be an RN, a regular, a DeNB, or a gNB. In some implementations, the UE 801 may be embodied in various types of user devices such as a mobile phone, a smart phone, a personal digital assistant (PDA), tablet, laptop computer, wearable computing device, etc. The processor modules 814 and 836 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 814 and 836, respectively, or in any practical combination thereof. The memory modules 816 and 834 may be realized as RAM memory, flash memory, ROM memory, EPROM memory, EEPROM memory, registers, a hard disk, a removable disk, a CD-ROM, or any other form of storage medium known in the art. In this regard, memory modules 816 and 834 may be coupled to the processor modules 810 and 830, respectively, such that the processors modules 810 and 830 can read information from, and write information to, memory modules 816 and 834, respectively. The memory modules 816 and 834 may also be integrated into their respective processor modules 810 and 830. In some implementations, the memory modules 816 and 834 may each include a cache memory for storing temporary variables or other intermediate information during execution of instructions to be executed by processor modules 810 and 830, respectively. Memory modules 816 and 834 may also each include non-volatile memory for storing instructions to be executed by the processor modules 810 and 830, respectively.

The network communication module 818 generally represents the hardware, software, firmware, processing logic, and/or other components of the base station 802 that enable bi-directional communication between the transceiver 810 and other network components and communication nodes in communication with the base station 802. For example, the network communication module 818 may be configured to support internet or WiMAX traffic. In a deployment, without limitation, the network communication module 818 provides an 802.3 Ethernet interface such that the transceiver 810 can communicate with a conventional Ethernet based computer network. In this manner, the network communication module 818 may include a physical interface for connection to the computer network (e.g., Mobile Switching Center (MSC)). In some implementations, the network communication module 818 includes a fiber transport connection configured to connect the base station 802 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various implementations of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one implementation can be combined with one or more features of another implementation described herein. Thus, the breadth and scope of the present disclosure should not be limited by any of the above-described illustrative implementations.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according implementations of the present solution.

Additionally, memory or other storage, as well as communication components, may be employed in implementations of the present solution. It will be appreciated that, for clarity purposes, the above description has described implementations of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
   determining, by a wireless communication device, that at least a portion of a first uplink (UL) resource is canceled due to overlapping with an indicated resource indicated by an UL Cancellation Indication (UL CI) received from a base station; and
   determining, by the wireless communication device, a cancellation time point associated with cancellation of the at least a portion of the first UL resource, the cancellation time point being between a last symbol of the UL CI and a first symbol of the indicated resource or at a beginning of the first symbol of the indicated resource; and
   in response to determining the cancellation time point, determining, by the wireless communication device, whether a second UL resource is to be used to transmit UL data, wherein the second UL resource is determined based on the determined cancellation time point.

2. The method of claim 1, wherein an entirety of the first UL resource is canceled.

3. The method of claim 2, wherein
   the second UL resource is scheduled by an UL grant to be before the indicated resource; and
   a last symbol of the second UL resource is before a first symbol of the indicated resource.

4. The method of claim 2, wherein
   the second UL resource is scheduled by an UL grant to be before the first UL resource; and
   a last symbol of the second UL resource is before a first symbol of the first UL resource.

5. The method of claim 2, wherein
   the second UL resource is scheduled by an UL grant to be after the first UL resource; and
   a first symbol of the second UL resource is after a last symbol of the first UL resource.

6. The method of claim 2, wherein a first symbol of the first resource is no earlier than the cancellation time point.

7. The method of claim 6, wherein
   the second UL resource is scheduled by an UL grant to be before the cancellation time point; and
   a last symbol of the second UL resource is before a first symbol of the cancellation time point.

8. The method of claim 1, wherein a canceled portion but not all of the first UL resource is canceled.

9. The method of claim 8, wherein
   the second UL resource is scheduled by an UL grant to be after the canceled portion of the first UL resource; and
   a first symbol of the second UL resource is after a last symbol of the canceled portion of the first UL resource.

10. The method of claim 8, wherein
    the second UL resource is scheduled by an UL grant to be after the first UL resource; and
    a first symbol of the second UL resource is after a last symbol of the first UL resource.

11. The method of claim 8, wherein a first symbol of the first resource is earlier than the cancellation time point.

12. The method of claim 11, wherein
    the second UL resource is scheduled by an UL grant to be after the cancellation time point; and
    a first symbol of the second UL resource is after the cancellation time point.

13. The method of claim 1, wherein the cancellation point is determined according to a transmission type of the first UL resource.

14. The method of claim 13, wherein the cancellation point is determined according to a high layer signaling.

15. The method of claim 1, wherein the cancellation time point is between a last symbol of the UL CI and a first symbol of the indicated resource, wherein determining the cancellation time point comprises determining a duration between the cancellation time point and the first symbol of the indicated resource.

16. The method of claim 1, wherein a duration between the cancellation time point and a first symbol of the indicated resource is no longer than a duration threshold.

17. A wireless communication device, comprising:
    at least one processor configured to:
        determine that at least a portion of a first uplink (UL) resource is canceled due to overlapping with an indicated resource indicated by an UL Cancellation Indication (UL CI) received from a base station;
        determine a cancellation time point associated with cancellation of the at least a portion of the first UL resource, the cancellation time point being between a last symbol of the UL CI and a first symbol of the indicated resource or at a beginning of the first symbol of the indicated resource; and
        in response to determining the cancellation time point, determine whether a second UL resource is to be used to transmit UL data, wherein the second UL resource is determined based on the determined cancellation time point.

18. A wireless communication method, comprising:
    sending, by a base station to a wireless communication device, an UL Cancellation Indication (UL CI) indicating a resource,
    wherein the wireless communication device determines that at least a portion of a first uplink (UL) resource is canceled due to overlapping with the indicated resource, determines a cancellation time point associated with cancellation of the at least a portion of the first UL resource, the cancellation time point being between a last symbol of the UL CI and a first symbol of the indicated resource or at a beginning of the first symbol of the indicated resource, and determines whether a second UL resource is to be used to transmit UL data, in response to determining the cancellation time point, wherein the second UL resource is determined based on the determined cancellation time point.

19. A base station comprising:

at least one processor configured to:

send, via a transmitter to a wireless communication device, an UL cancellation Indication (UL CI) indicating a resource, wherein the wireless communication device determines that at least a portion of a first uplink (UL) resource is canceled due to overlapping with the indicated resource, determines a cancellation time point associated with cancellation of the at least a portion of the first UL resource, the cancellation time point being between a last symbol of the UL CI and a first symbol of the indicated resource or at a beginning of the first symbol of the indicated resource, and determines whether a second UL resource is to be used to transmit UL data, in response to determining the cancellation time point, wherein the second UL resource is determined based on the determined cancellation time point.

* * * * *